US012759327B2

(12) United States Patent
Maynard

(10) Patent No.: US 12,759,327 B2
(45) Date of Patent: Oct. 13, 2026

(54) METHOD AND ASSEMBLY TO LIFT A PRINTHEAD WITHIN A MEDIA PROCESSING DEVICE

(71) Applicant: ZEBRA TECHNOLOGIES CORPORATION, Lincolnshire, IL (US)

(72) Inventor: Raymond E. Maynard, Westerly, RI (US)

(73) Assignee: Zebra Technologies Corporation, Lincolnshire, IL (US)

(*) Notice: Subject to any disclaimer, the term of this patent is extended or adjusted under 35 U.S.C. 154(b) by 271 days.

(21) Appl. No.: 18/390,215

(22) Filed: Dec. 20, 2023

(65) Prior Publication Data

US 2025/0206048 A1 Jun. 26, 2025

(51) Int. Cl.

| | |
|---|---|
| ***B41J 25/308*** | (2006.01) |
| ***B41J 11/04*** | (2006.01) |
| ***B41J 11/14*** | (2006.01) |
| ***B41J 11/20*** | (2006.01) |
| ***B41J 25/312*** | (2006.01) |

(52) U.S. Cl.
CPC ........... *B41J 25/3088* (2013.01); *B41J 11/04* (2013.01); *B41J 11/14* (2013.01); *B41J 11/20* (2013.01); *B41J 25/3082* (2013.01); *B41J 25/312* (2013.01); *B41J 2202/31* (2013.01)

(58) Field of Classification Search
CPC ...... B41J 25/308; B41J 25/3088; B41J 11/02; B41J 11/04; B41J 2202/30; B41J 2202/31
See application file for complete search history.

(56) References Cited

U.S. PATENT DOCUMENTS

2003/0146968 A1* 8/2003 Milton .................. B41J 3/4075
347/197

FOREIGN PATENT DOCUMENTS

JP H08224933 A * 9/1996

* cited by examiner

*Primary Examiner* — Douglas X Rodriguez
*Assistant Examiner* — Kendrick X Liu

(57) ABSTRACT

A media processing device is disclosed that includes a platen assembly, a printhead assembly, a drive element, and a processor. The platen assembly includes a platen roller configured to rotate. The printhead assembly, disposed opposite the platen assembly, is configured to move between an engaged position in which the printhead assembly forms a nip with the platen roller and a disengaged position in which the printhead assembly is spaced away from the platen roller. The drive element is configured to rotate the platen roller. The processor is in communication with the drive element, and configured to control the drive element to rotate the platen roller according to a first operating mode or a second operation mode, the printhead assembly moves to the engaged position in the first operating mode and moves to the disengaged position in the second operating mode.

13 Claims, 12 Drawing Sheets

METHOD AND ASSEMBLY TO LIFT A PRINTHEAD WITHIN A MEDIA PROCESSING DEVICE

BACKGROUND

Media processing devices, or printers, were developed to allow a user to process media on-demand. However, occasionally significant time may pass between on demand media processing requests, which means that mechanical stresses within the printer that are necessary for processing media, are ongoing throughout the times when no processing is happening. By having a process of temporarily reducing the pressures on elements within the printer, the lifetime of the elements may significantly increase.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
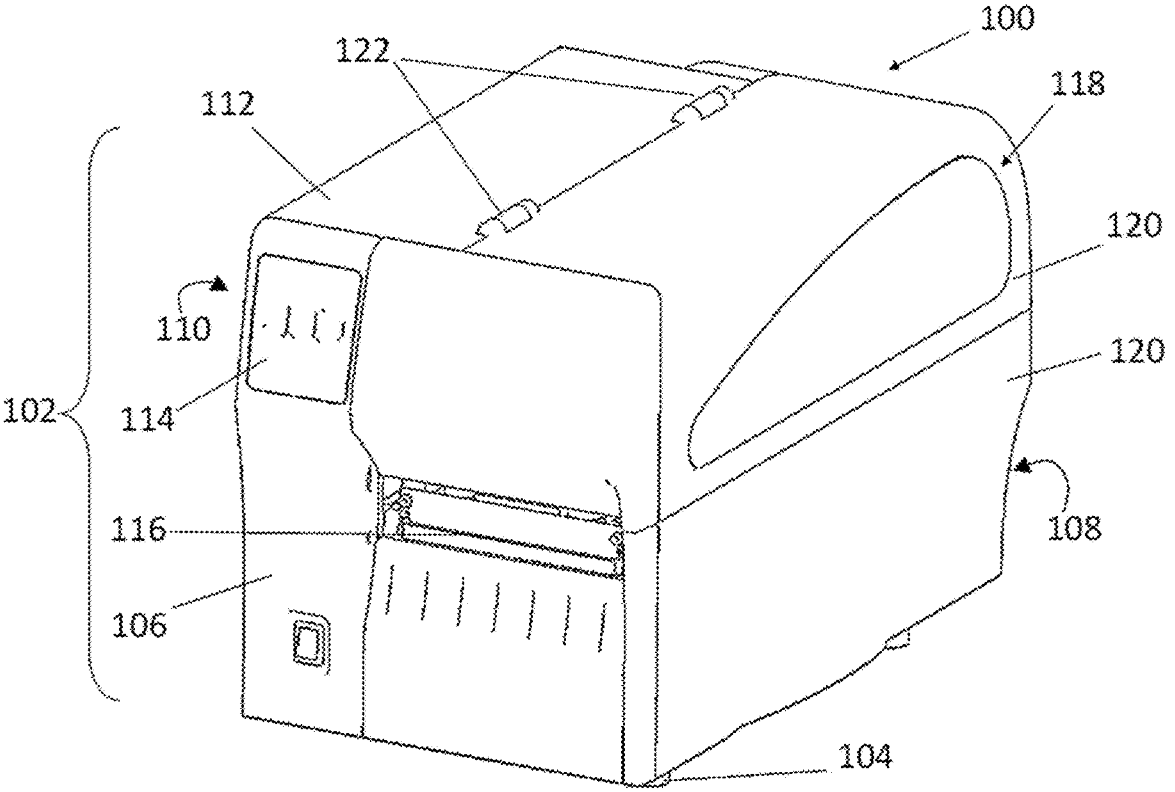
FIG. 1 illustrates an example media processing device in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Embodiments of printers and media processing devices of the present disclosure can process (e.g., print, encode, etc.) media by drawing the media from the media source and routing the media proximate various processing components (e.g., printhead, RFID reader/encoder, magnetic stripe reader/encoder etc.). Processing the media from the media source may facilitate a continuous or batch printing process. As an example, embodiments of printers and media processing devices of the present disclosure may be configured to print and/or encode media drawn from a media source, such as roll, spool, or fanfold. Such media may include a continuous web such as a spool of linerless media. The continuous web of linerless media is coated on one surface with a pressure sensitive adhesive and includes a printable surface on the opposite surface. For thermal transfer printing, the printable surface of the linerless media is configured to receive a pigment (e.g., ink, resin, wax-resin, etc.) that is transferred from a ribbon supply. For direct thermal printing, a thermal printhead of the printer directly contacts the printable surface triggering a chemical and/or physical change in a thermally sensitive dye covering and/or embedded in at least a portion of the printable surface of the media.

A printer is intermittently utilized to produce media for a user. During the downtime of a printer, the printer might sit idle for an extended period. The printer can process a web of media by feeding the media between a platen and a printhead, where the platen is positioned opposite a printhead. The platen and the printhead may come together to create a nip which is formed when pressure is applied to the platen by the printhead. The nip allows the platen to properly grip and drive the web of media past the printhead for processing. When a printer sits idle for an extended period with the printhead and the platen in a nipped position, the platen may be disfigured or damaged by the constant pressure applied via the printhead to one area of the platen. Additionally, when media is located between the printhead and the platen, and the printer is sitting idle, the media might be damaged or marred. Damage to the surface of media may result in improper processing when it comes time to process the media or result in degraded print quality. When the media is a linerless-type media, the side of the media including the adhesive is in contact with the platen, which may cause the adhesive to transfer to the platen, causing the surface of the platen to become sticky and adhere to media unintendedly.

When the printer is sitting idle, it would be advantageous to temporarily raise the printhead away from the platen so as to take the pressure off the platen to mitigate the aforementioned issues. By using internal components of the printer in the raising of the printhead, the advantage can be reached with minimal cost to the user.

In accordance with embodiments of the present disclosure, a printer and/or media processing device is disclosed. The media processing device includes a platen assembly, a printhead assembly, a drive element, and a processor. The platen roller configured to rotate. The printhead assembly, disposed opposite the platen assembly, configured to move between an engaged position in which the printhead assembly forms a nip with the platen roller and a disengaged position in which the printhead assembly is spaced away from the platen roller. The drive element configured to rotate the platen roller. The processor in communication with the drive element, the processor configured to control the drive element to rotate the platen roller according to a first operating mode or a second operation mode, the printhead assembly moves to the engaged position in the first operating mode and moves to the disengaged position in the second operating mode.

A further embodiment includes wherein, when the processor operates per the first operating mode, the drive element rotates the platen roller in a first direction and when the processor operates per the second operating mode, the drive element rotates the platen roller in a second direction opposite the first direction. Additionally or alternatively, the first direction is associated with the platen roller driving media.

Another embodiment includes a housing having a cover, wherein the cover remains closed in the first and second modes of operation.

A further embodiment includes wherein the platen assembly comprises a cam having a variable cam perimeter, wherein the cam perimeter forms a nip with the printhead assembly and forces the printhead assembly into the disengaged position.

Another embodiment includes wherein the platen assembly includes a drive gear concentrically secured to the platen roller, the drive gear in contact with a drivetrain of a motor within the media processing device.

A further embodiment includes wherein a cam assembly comprises: a clutch element mounted to the platen roller, and a rising cam element mounted around a perimeter of the clutch element; wherein when the platen roller is driven in the first direction, the clutch element allows the rising cam element to remain stationary due to contact with the printhead assembly and when the platen roller is driven in the second direction, the rising cam element rotates with the platen roller and, via a profile of the rising cam element, lifts the printhead assembly.

Another embodiment includes wherein when the printhead assembly is at the clearance level, there is no pressure on the media between the platen assembly and the printhead assembly.

Further embodiments include wherein the first operating mode is when the media processing device is idle.

Another embodiment featured in the below disclosure includes wherein a strap is connected between the printhead assembly and the platen roller such that when the platen roller is driven in the second direction, the strap is configured to lift the printhead assembly.

Further embodiments include wherein the at least one cam assembly features a contact surface which contacts the printhead assembly and prevents the at least one cam from rotating in the first direction when the platen assembly is being driven in the first direction during operation.

Other possible embodiments involve wherein the cam assembly includes a clutch configured to allow the cam assembly to be driven in a first direction.

An embodiment supported by the disclosure below includes a method for lifting a printhead assembly, the method including: rotating a platen assembly in a first direction, the platen assembly disposed opposite the printhead assembly, wherein the platen assembly includes a cam assembly that is blocked from rotating with the platen assembly; rotating the platen assembly in a second direction opposite the first direction, wherein the cam assembly rotates with the platen assembly in the second direction; and lifting, due to a profile of the cam assembly, the printhead assembly to generate a clearance between the printhead assembly and the platen assembly.

Further embodiments include wherein the first direction is associated with a platen roller driving media, the platen roller associated with the platen assembly.

Additional embodiments include wherein the cam profile includes a dynamic radius.

Further embodiments include wherein the platen assembly includes a drive gear concentrically secured to the platen roller, the drive gear in contact with a drivetrain of a motor to rotate the platen assembly.

Additionally, the method includes wherein the cam assembly comprises: a clutch element mounted within the platen assembly, and a rising cam element mounted around a perimeter of the clutch element; wherein when the platen assembly is driven in the first direction, the clutch element allows the rising cam element to remain stationary due to contact with the printhead assembly and when the platen assembly is driven in the second direction, the rising cam element rotates with the platen assembly and, via a profile of the rising cam element, lifts the printhead assembly.

Further embodiments of the method allow wherein a strap is connected between the printhead assembly and the platen assembly such that when the platen assembly is driven in the second direction, the strap is configured to lift the printhead assembly.

An embodiment as described in the disclosure below includes a platen assembly including: a platen roller defining first and second ends; a platen axis, concentric to the platen roller, extending between the first and second ends; at least one cam assembly, the at least one cam assembly comprising: a clutch element mounted to the platen roller, and a rising cam element mounted around a perimeter of the clutch element; and a drive element securely mounted to the platen roller, the drive element configured to be driven by a motor causing the rotation of the platen roller; wherein: when the platen roller is driven in a first direction, the rising cam element is configured to not rotate, and when the platen roller is driven in a second direction, the rising cam element is configured to rotate with the platen roller. Further embodiments include wherein when the platen roller is driven in the second direction, the platen roller pauses rotation before completing a complete revolution.

An embodiment as described in the disclosure below includes a media processing device including: a housing; a processor; a printhead assembly, supported within the housing, configured to move between an engaged position and a disengaged position; a platen assembly disposed opposite the printhead assembly, the platen assembly comprising: a platen roller configured to rotate about a platen axis, the platen roller defining first and second ends, and at least one cam assembly located on one of the first and second ends; and a drive element in communication with the processor, the drive element configured to rotate the platen roller in a first direction or a second direction; wherein when the processor enters a first operating mode: the drive element rotates the platen assembly is a second direction opposite the first direction; and the at least one cam assembly acts against the printhead assembly and raises the printhead assembly to a clearance level.

Figure 2:
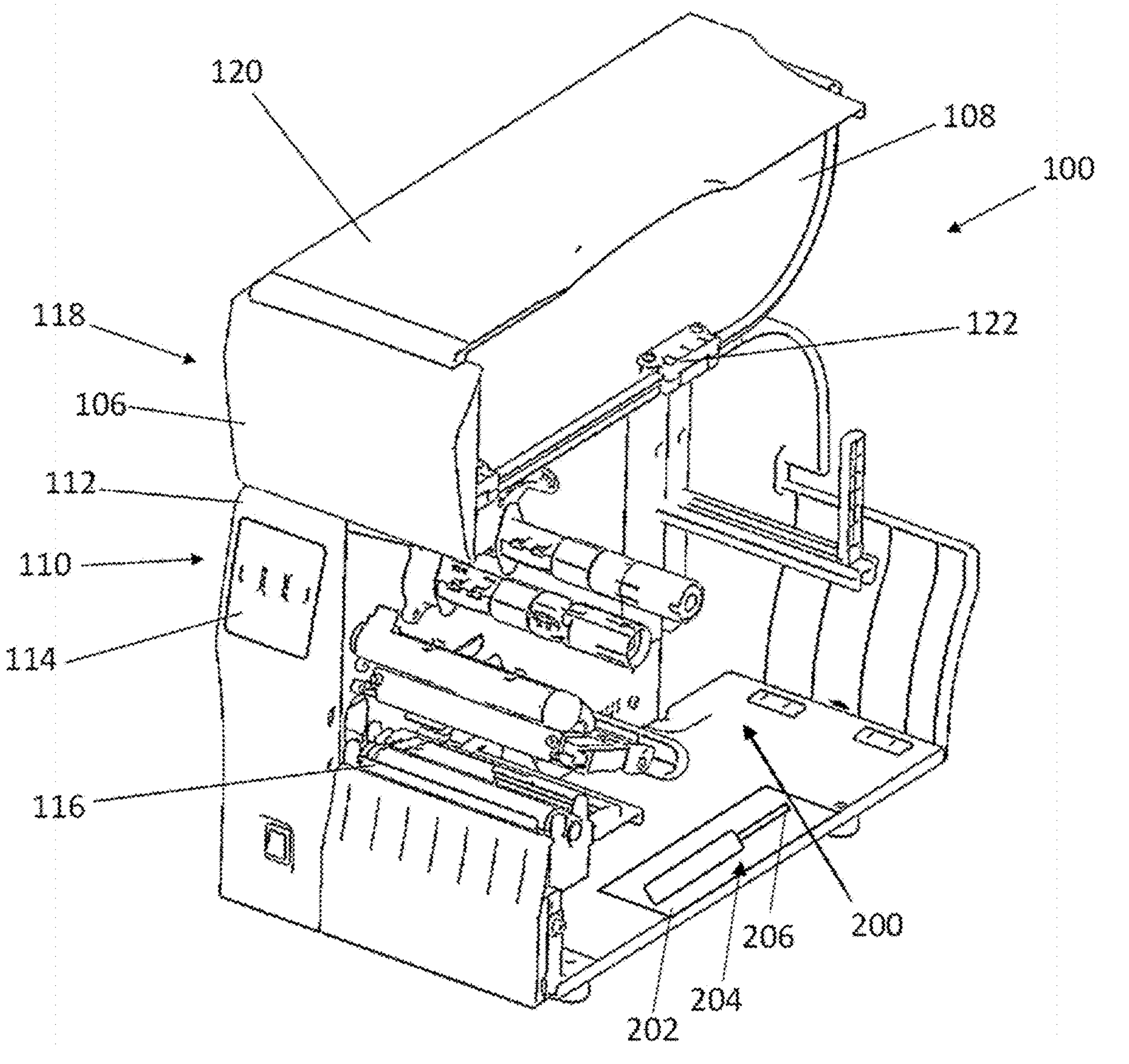
FIG. 2 illustrates the example media processing device of FIG. 1 with an access door assembly in an open position in accordance with embodiments of the present disclosure.
Figure 3:
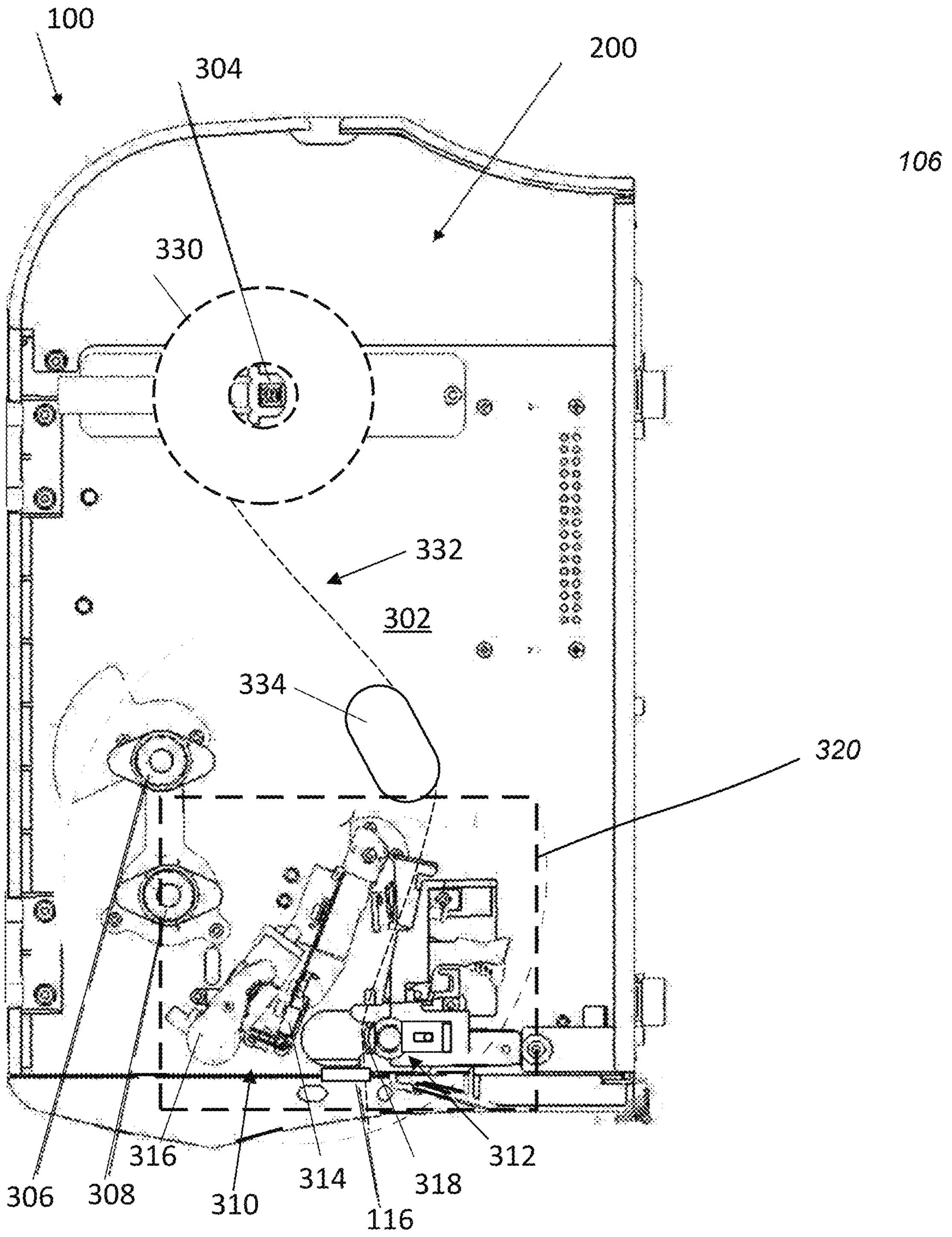
FIG. 3 illustrates a side profile of an internal cavity of the example media processing device of FIG. 1 in accordance with embodiments of the present disclosure.

FIGS. 1-3 illustrate an example of a printer and/or media processing device 100 in accordance with embodiments of the present disclosure. The media processing device 100 includes a housing 102 and a base 104. The housing 102 may include a front panel 106, a rear panel 108, a side panel 110, a support surface 112, and an access door or cover assembly 118. The housing 102 may include a user interface 114 and a media outlet or exit 116. The media exit 116 may be arranged in the front panel 106 of the media processing device 100 and may be configured to expel media through a slot after it has been processed. The access door assembly 118 includes one or more doors or covers 120 and can be hingedly attached to the support surface 112 with hinges 122. The access door assembly 118 is illustrated in the closed or operational position in FIG. 1, in which access to the internal components of the media processing device 100 is precluded. In addition to keeping dirt, dust, and foreign objects from entering an internal cavity of the media processing device 100 and potentially contaminating the consumables or the electronics of the processing device 100, the closed position of the access door assembly 118 may also reduce noise and prevent users from inadvertently touching sensitive components.

The access door assembly 118 may pivot about hinges 122 through a range of approximately 180 degrees to a major support position to provide access to an interior cavity 200 of the media processing device 100 in an open or non-operational position as illustrated in FIG. 2. The hinges 122 may be located proximate a centerline of the housing 102 defined between the support surface 112 and the access door assembly 118. Positioning the hinges 122 proximate a centerline of the housing 102 allows the access door assembly 118 to pivot about hinges 122 and achieve the support position when the access door assembly 118 comes to rest on the support surface 112. In some embodiments, the access door assembly 118 may include at least a portion of the front panel 106 and/or a portion of the rear panel 108 to provide greater access to the interior cavity 200 when the access door assembly 118 is positioned in the open position. Operation of the media processing device 100 may be precluded when the access door assembly 118 is in the open position.

As shown in FIGS. 2-3, when the access door assembly 118 is in the open position, components for loading and unloading consumables (e.g., print media and printer ribbon) within internal cavity 200 can be accessible and components associated with processing media along a feed path can be viewed. Access to the internal cavity 200 can be provided, for example, at least partially, through at least three sides (e.g., the front side via a portion of the front panel 106, the access door side and top side through the access door assembly 118, and/or the rear side 108 via a portion of the rear panel 319) which permit easier access and view of the components within the cavity 200.

FIG. 3 illustrates a side view of the media processing device 100 with the access door assembly 320 omitted for clarity and showing the internal cavity 200 and a chassis 302 that supports at least some of the components for processing media along the feed path. Box 320 highlights an area including the printhead assembly 310 and the platen assembly 312.

Figure 4:
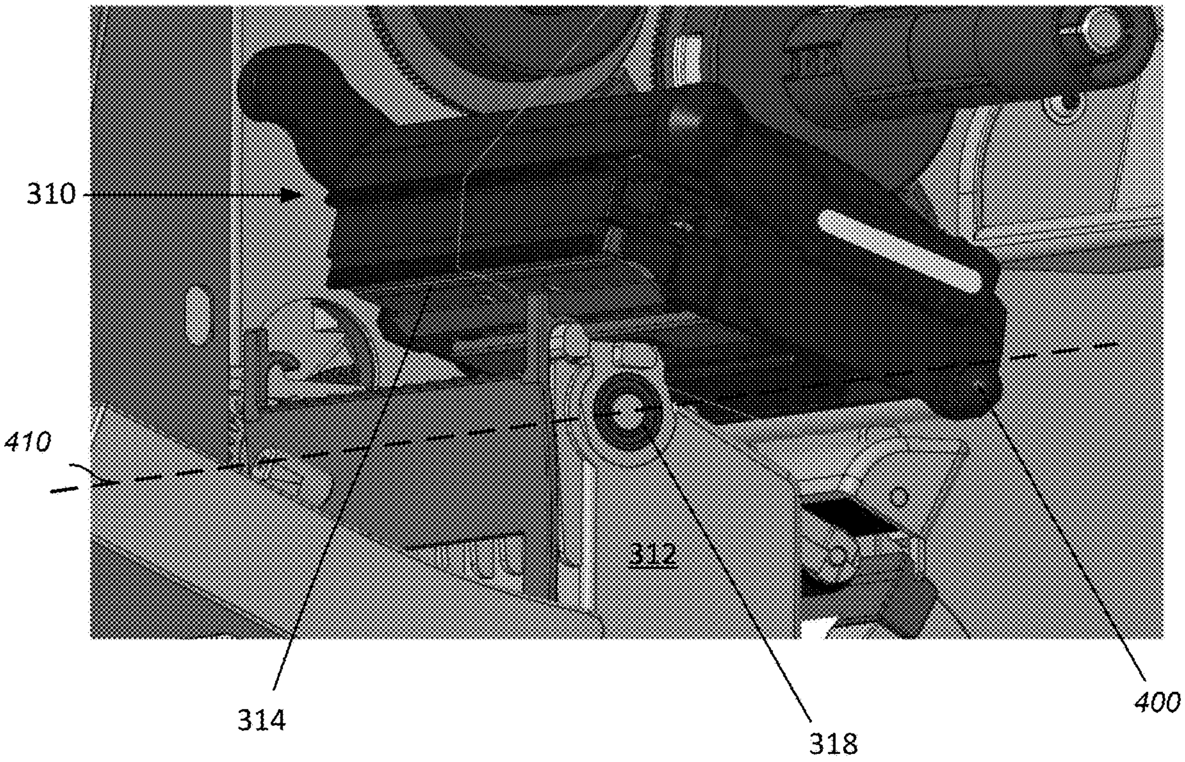
FIG. 4 illustrates an enhanced view from a section noted in FIG. 3 in accordance with embodiments of the present disclosure.

FIG. 4 illustrates an enhanced view of box 320 of FIG. 3. As illustrated in FIG. 4, the printhead assembly 310 is in a disengaged position which would allow loading of media along the media feed path which passes between the printhead assembly 310 and the platen roller assembly 318. When the printhead assembly 310 is in the disengaged position as shown, the printhead 314 is moved upwards away from the platen assembly 312 but pivoting the printhead assembly 310 along a printhead pivot 400. As will be discussed later, the printhead assembly may be moved into the disengaged position in a variety of ways based upon the rotation of the platen roller.

FIG. 4 depicts the platen assembly 312 containing the platen roller assembly 318. The platen roller assembly 318 rotates along platen axis 410, supported within the platen assembly 312. The platen roller assembly 318 is removable from the platen assembly 312, for example, when it is time to replace the platen roller assembly 318.

Figure 5:
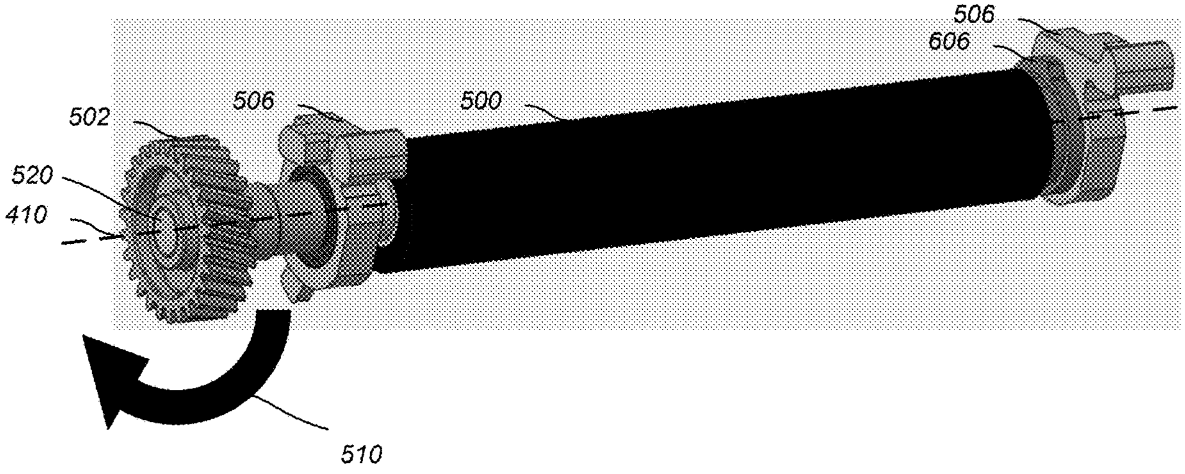
FIG. 5 illustrates a platen roller assembly of the media processing device of FIG. 1 in accordance with embodiments of the present disclosure.

FIG. 5 depicts the platen roller assembly 318. The platen roller assembly 318 is a collection of elements, the collection releasably contained within the printer 100. The platen roller assembly 318 includes a platen surface 500, a drive gear 502, at least one cam assembly 606 (or at least two cam assemblies 606), at least one retaining bracket 506, and axle 520. The axle 520 is a shaft that is configured to support the other components of the platen roller assembly 318 coaxially. The platen surface 500 combined with the axle 520 is collectively known herein as the platen roller 522. The platen roller 522 is disposed opposite the printhead during active printer operation. The platen roller 522 combined with the drive gear 502 and the at least one cam assembly 606 form the platen roller assembly 318.

When the printhead assembly 310 is in the engaged position, the platen roller 522, as depicted in FIG. 5, is configured to press against the printhead 314. The platen roller 522 (e.g., the platen surface 500) is deformed to cause a slight rise which aids in gripping the media during processing by the printer 100. The platen roller 522 is coated with a material that is malleable to allow it to mold and flex as needed, yet is resilient enough to maintain shape. The material of the platen roller 522 has a friction of coefficient that is sufficient to generally prevent the media from slipping against the platen roller 522.

The drive gear 502 is depicted as a spur gear, but may be any of a variety of gears capable of conveying rotational drive motion. The drive gear 502 is configured to mesh with a drive motor 1170 within the printer 100. In some embodiments, the drive motor 1170 and the drive gear 502 are connected via a gear train 1180 (or drive train 1180) which translates the rotational movement from the drive motor 1170 to the drive gear 502. The drive motor 1170 is configured to operate in a first operating mode and a second operating mode. In the first operational mode, the drive gear 502 is driven by the drive motor 1170 to rotate in a first direction indicated by arrow 510 (e.g., clockwise in the orientation shown in FIG. 5) about the axis 410. In the second operational mode, the drive gear 502 is driven by the drive motor 1170 to rotate in a second direction opposite arrow 510 (e.g., counterclockwise in the orientation shown in FIG. 5) about the axis 410. The drive gear 502 is rigidly connected to a platen axle 520 such that when the drive gear 502 is rotated, the platen axle 520, the cam assembly 606 (a cam 504 connected to the axle 520 via a clutch 600), and the platen roller 500 rotate in unison with the drive gear 502. The rotation of the cam assembly 606 with respect to the platen roller 500 during the first operating mode and the second operating mode is described below in additional detail.

When operating in the first operating mode, the printhead abuts against the platen roller 500 to form the nip (deforming the platen roller 522) and the drive motor 1170 is configured to drive the platen roller 522 in the first direction to drive media towards the output of the printer. The printhead is configured to maintain the pressure against the platen surface 500 of the platen roller 522 in the first operating mode and may facilitate intermittently printing on demand.

When operating in the second mode of operation, the cam assembly 606 is configured to rotate with the platen roller 522 in the second direction. The cam assembly 606 is addressed in further detail below. The second operating mode works to separate the printhead from the platen roller 522 to release the nip and relieve the pressure from the printhead on the surface 500 of the platen roller 522. The printhead can be lifted against a biasing force that urges the printhead towards the platen roller 522 to a disengaged position to remove the printhead pressure from the platen roller 500. The second operating mode is determined by the processor 1150 based on triggering events. The processor 1150 is configured to execute instructions stored in memory 1160 (e.g., a non-transitory computer-readable medium) to perform embodiments of the present disclosure including, e.g., controlling the operating modes of the printer. One such triggering event causing the process to enter the second operating mode may be when the media processing device enters an idle mode, where the media processing device has sat without operating for a set period of time. Once the second operating mode is triggered, the platen roller 522 is driven in the second direction and the printhead is lifted away from the platen roller 522 such that the printhead no longer forms a nip with the platen roller 522.

Figure 6:
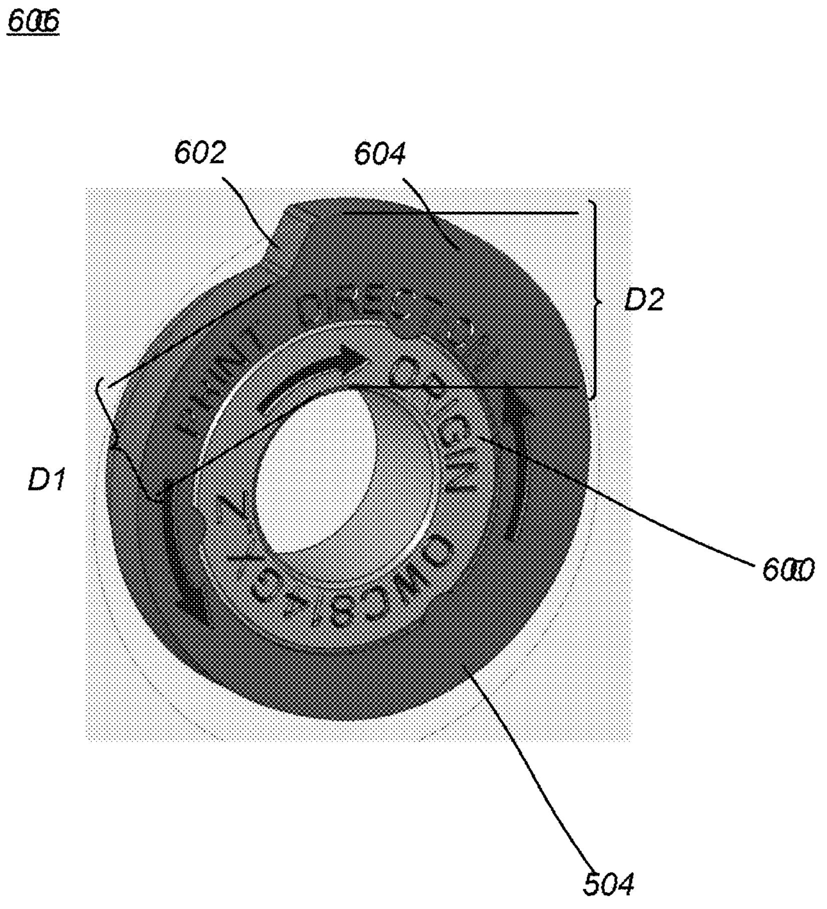
FIG. 6 illustrates a cam assembly of the platen assembly of FIG. 5 in accordance with embodiments of the present disclosure.

FIG. 6 depicts the cam assembly 606 which includes the cam 504 having an internal clutch 600. The clutch 600 is intended to secure the cam 504 to the platen axle 520. The relationship between the cam 504 and the clutch 600 will be discussed further below. The cam 504 further includes a rising cam element 604 which causes the cam 504 to have a greater radius in some areas than in others. Distance D1 is illustrative of a minimum distance between the outside of the cam to an inside surface of the clutch 600, wherein distance D2 is representative of a maximum distance between the outside of the cam to the inside surface of the clutch 600. In the depicted embodiment, D2 is larger than D1. The difference in the cam heights D1 and D2 allows the cam 504 to rotate and press against the printhead assembly as it rotates, causing the printhead to move a distance D1 away from the axle 520 to a distance of D2 from the axle 520. In some embodiments, the distances D1 and D2 can be optimized to fit the particular printer 100, so long as when D1 is aligned with the printhead, the printhead is in operatable distance to the platen surface 500 of the platen roller 522, and when D2 is aligned with the printhead, the printhead is disengaged from the platen surface 500 of the platen roller 522. The change in distance is enough to separate the printhead from the platen roller 522. The cam surface 602 is configured to abut against the printhead assembly during the first operating mode, preventing the cam 504 from rotating but allowing the clutch 600 to rotate with the platen roller 522 within the cam 504.

Returning to FIG. 5, the platen roller assembly 318 may include at least one platen bracket 506. The platen bracket 506 may mesh with the printer 100 to allow the platen roller assembly 318 to easily be secured into, and removed from, the platen assembly without the need of additional tools. The platen bracket 506 is securely mounted to the platen axle 520 and is configured to secure to the printer 100 such that the platen assembly 318 is secured.

Figure 7:
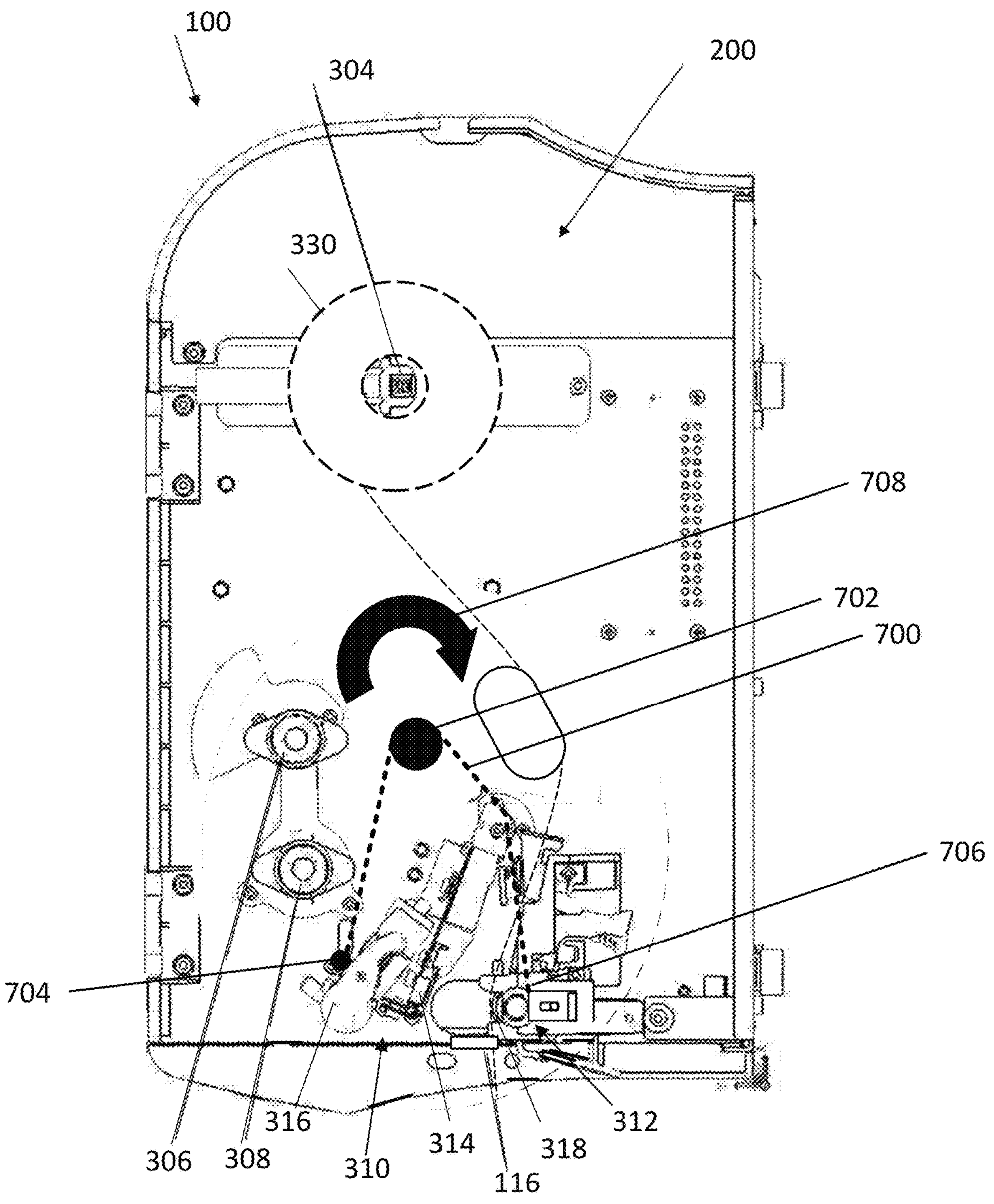
FIG. 7 illustrates a platen roller assembly in accordance with embodiments of the present disclosure.

FIG. 7 depicts an embodiment to move the printhead assembly 310 into the disengaged position via a strap 700. As depicted in FIG. 7, a strap 700 is threaded from the platen assembly 706, around a guide element 702, and is secured to the printhead assembly 310 at securing point 704. The strap 700 may be a non-elastic strap of plastic or fabric in the depicted embodiment, however in other embodiments the strap 700 may be rope, strip, chain, belt, plastic strip, or any other type of flexible cordage that has a tensile strength suitable to raise the printhead assembly to the disengaged position.

In the embodiment depicted in FIG. 7, when the printhead assembly 310 is in the engaged position and the platen roller assembly 318 is driven within the second operating mode, the strap 700 is pulled by the platen roller assembly 318 either by winding the strap 700 around an element of the platen roller assembly 318 or by another mean known in the art. As the strap 700 is pulled, the strap 700 is tightened around the guide element 702 and applies a pulling force on the printhead assembly 310. The force on the printhead assembly 310 causes it to rotate around the printheads pivot in a direction indicated by arrow 708. In operation, the strap 700 would not have to pull much on the printhead assembly 310, the strap 700 would have to pull just enough to move the printhead away from the platen roller assembly 318 such that a nip is no longer formed, into a disengaged position. When the printer 100 is to be used, the first operating mode will be activated, causing the strap 700 to be slowly loosened rather than tensioned, resulting in the printhead assembly to be lowered into the engaged position.

Figure 8:
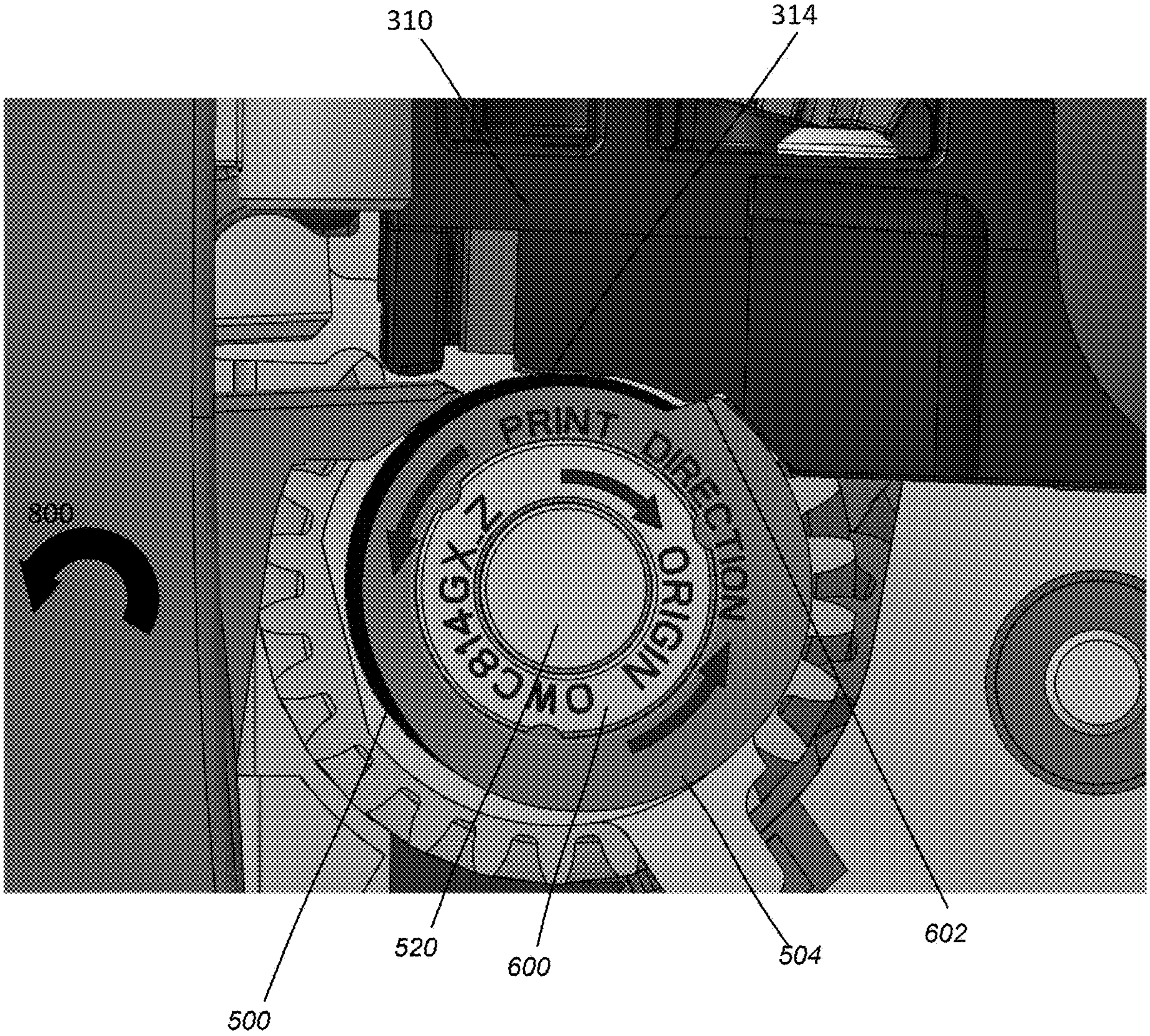
FIG. 8 illustrates the platen roller assembly with the cam assembly in a first position in accordance with embodiments of the present disclosure.
Figure 9:
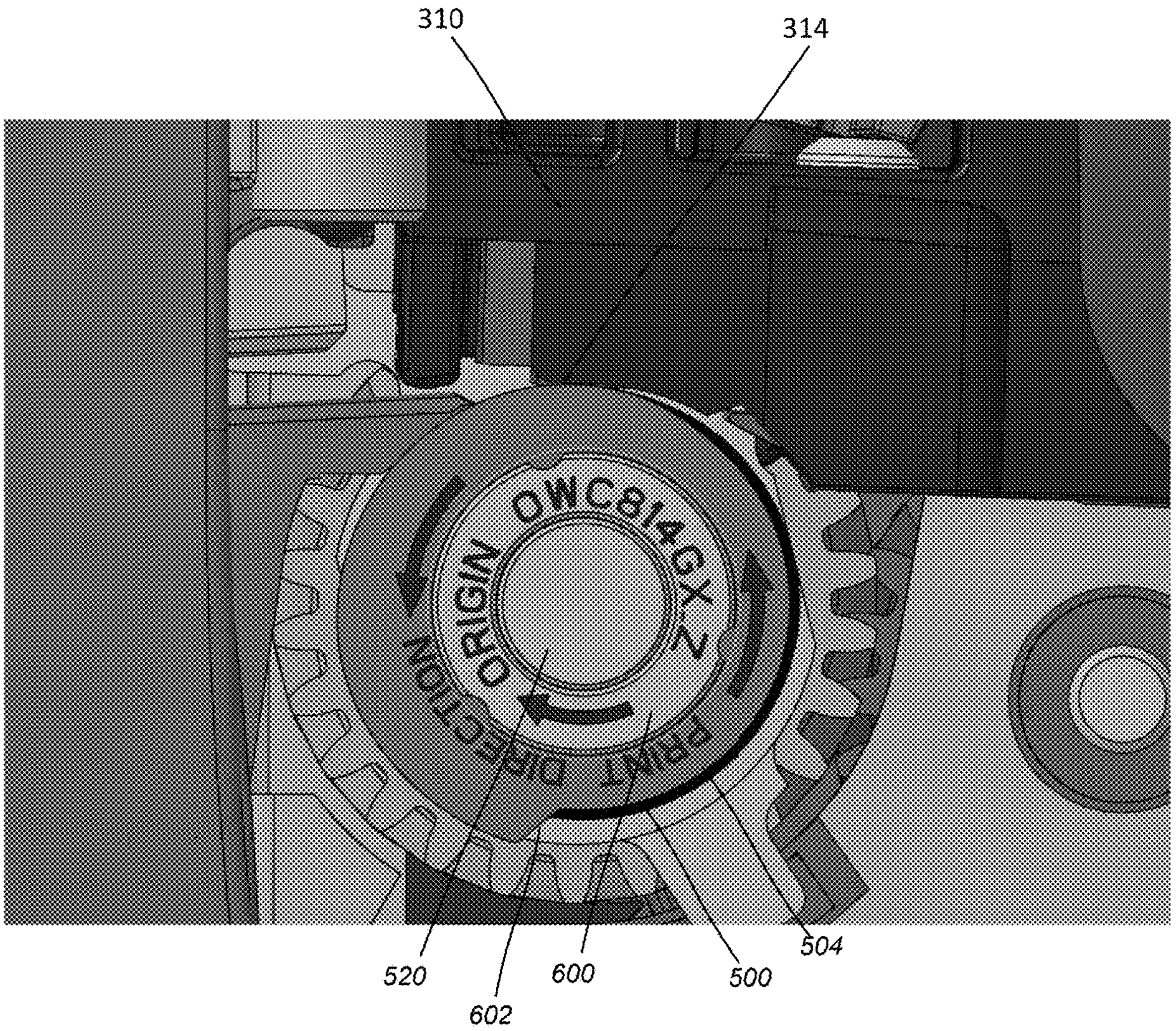
FIG. 9 illustrates the platen roller assembly with the cam assembly in a second position in accordance with embodiments of the present disclosure.
Figure 10:
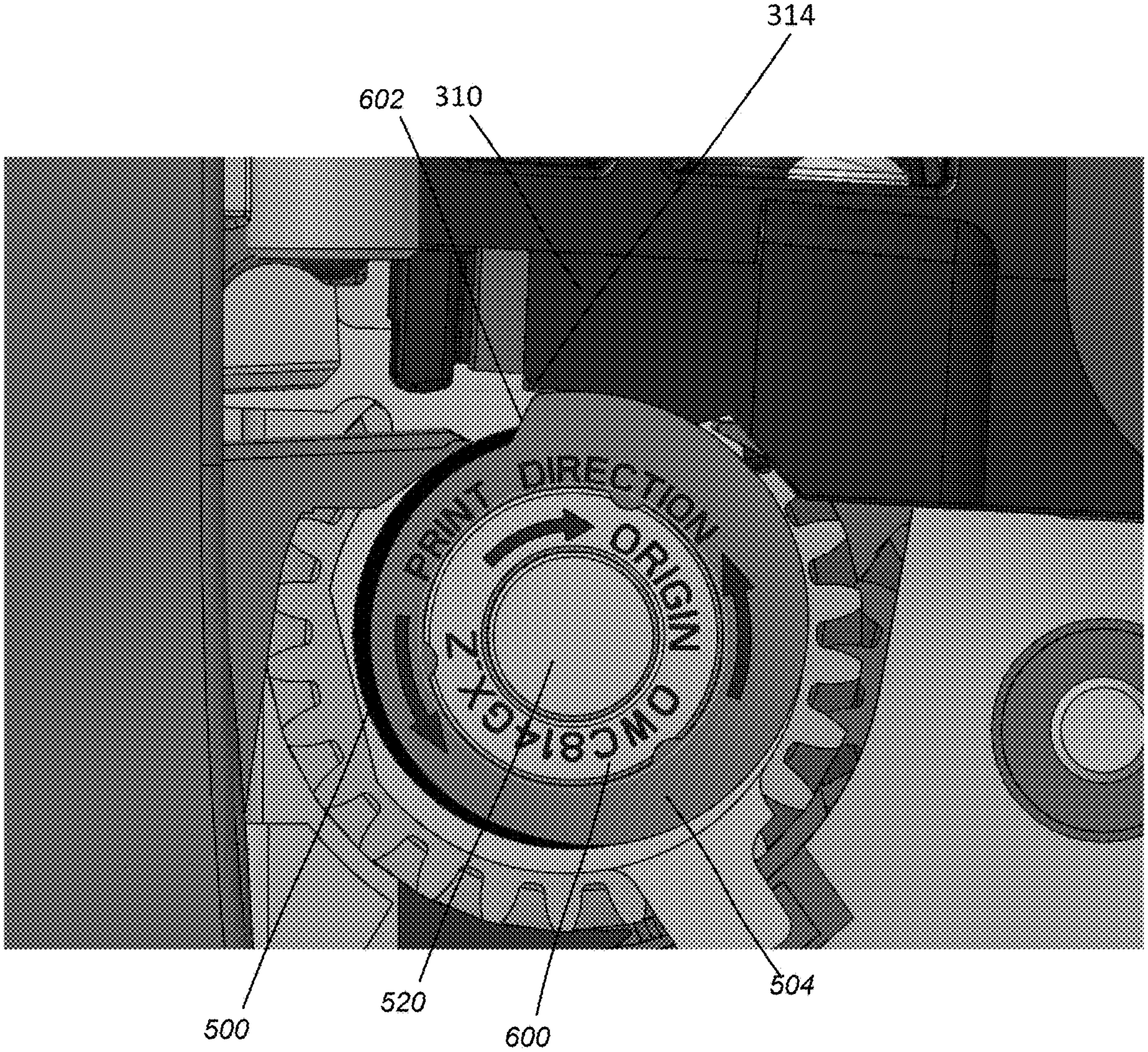
FIG. 10 illustrates the platen roller assembly with the cam assembly in a third position in accordance with embodiments of the present disclosure.

FIGS. 8-10 depict the interaction between the cam 504 and the printhead assembly 310 during the first operating mode and the second operating mode as the cam 504 is moved through a first position, a second position, and a third position.

As depicted in FIG. 8, when the processor 1150 activates the first operating mode, the platen roller 522 (e.g., the axle 520 and platen surface 500) is driven in a first direction as indicated by arrow 800. As the platen roller 522 is driven, the rotation of the axle 520 of the platen roller 522 is translated/transferred to the clutch 600 and then to the cam 504. When driving the platen roller 522 in the first direction, the cam 504 rotates with the clutch 600 until the cam surface 602 contacts a surface of the printhead assembly 310. Once the cam surface 602 contacts the printhead assembly the cam 504 can no longer rotate with the axle 520 and the cam 504 begins to slip on the clutch 600 such that the clutch 600 continues to rotate with the platen roller 522, but the cam 504 ceases rotating with the platen roller 522. The clutch 600 is configured to securely fit around the axle 520 of the platen roller 522. However, if the cam 504 is being blocked by the surface of the printhead assembly 310 (such as in FIG. 8) while the platen roller 522 is being driven, the surface of the printhead assembly provides a stopping force to the cam 504 and the clutch 600 will slip against the cam 504. The slippage allows the cam 504 to remain in one position without rotating while the while the clutch 600 continues to rotate. The first operating mode is the same operating mode in which the printer uses to process media. While moving in the first direction, the platen roller 522 is configured to drive media passed the print head for processing.

In some embodiments, prior to rotating from the first position to the third position, the platen roller 522 can drive the media forward by preset distance. The preset distance that the media is driven forward is to ensure that when the platen roller 522 rotates to the third position in the second direction, the media does not become unfed within the printer 100, which may cause a jam. In other words, to ensure that the platen roller 522 can re-engage the media when changing from the second operating mode back to the first operating mode, the media is fed a preset distance out of the printer to ensure that when the platen roller 522 rotates in the second direction, the media does not become back fed into the printer beyond the nip that is formed by the printhead and the platen roller 522 in the first operating mode.

FIG. 9 depicts the platen roller assembly 318 after the second operating mode is initialized. During the second operating mode, the platen roller 522 is driven in the second direction opposite the first direction. As the platen roller 522 rotates in the second direction, the cam 504 rotates with the clutch 600 which in turn is rotating correspondingly with the axle 520 of the platen roller 522. The second operating mode may be operable over a set rotational distance. In other words, this second operating mode is utilized to drive the platen roller 522 and the cam 504 (via the clutch 600) from the first position of FIG. 8 to the third position of FIG. 10.

It is important to note that during standard printing operation, the platen roller 522 is occasionally rotated in the second direction when the media needs to be reversed for processing. In some embodiments, the platen roller 522 may only need to rotate a third of a revolution in these cases, therefore it is important that the platen roller 522 and the printhead 314 forms a nip with the platen roller 522 through a partial rotation of the platen roller 522, i.e. half of a rotation, before the diameter of the cam 504 increases to a point where the cam 504 begins to contact and/or push against the printhead assembly 310.

FIG. 10 depicts the cam 504 in the third position. The platen roller 522 and cam 504 (via the clutch 600) is rotated such that the radius D2 of the cam 504 is pushing against the printhead assembly 310 in order to move the printhead 314 against a biasing force applied to the printhead 314 to the disengaged position. In some embodiments, to move from the first position to the third position, the platen roller 522 rotates seven eighths (⅞) of a full rotation in the second direction. In some embodiments, the cam 504 is rotating 55 mm which causes a printhead lift of 1.3 mm. The cam 504 accomplishes this due to the incline plane going around the perimeter of the cam 504. As the cam 504 rotates in the second direction, the printhead 314 goes from the D1 radius of cam 504 (in the first position of FIG. 8) to the D2 radius of the third position (shown in FIG. 10). When in the third position, the cam 504 is operable to maintain the distance D2 between the printhead 314 and the axle 520 of the platen roller 522 (or the inner surface of the clutch 600). The distance D2 allows for a reduction of pressure on the platen roller 522 by the printhead 314. It is important to note that if the platen roller 522 is continued to be driven in the second direction, then the cam 504 may rotate past the third position and the printhead 314 would go back down to the D1 distance that is featured in the first position as a result of the cam returning to the diameter D1 as described herein.

The third position is optimal for when the printer 100 will be idling for a period of time. When the printer 100 is preparing to be utilized (e.g., in the first mode of operation) and is moving from the third position back to the first position, then the platen roller 522 is driven either in the first direction or the second direction until the entirety of the printhead 314 is lowered into the platen roller surface and the cam surface 602 comes in contact with the printhead assembly surface. After which the platen roller 522 can be driven in the first direction and once the cam surface 602 contacts the printhead assembly surface, the cam 502 will be stationary and the clutch 600 will slip as described above.

Figure 11:
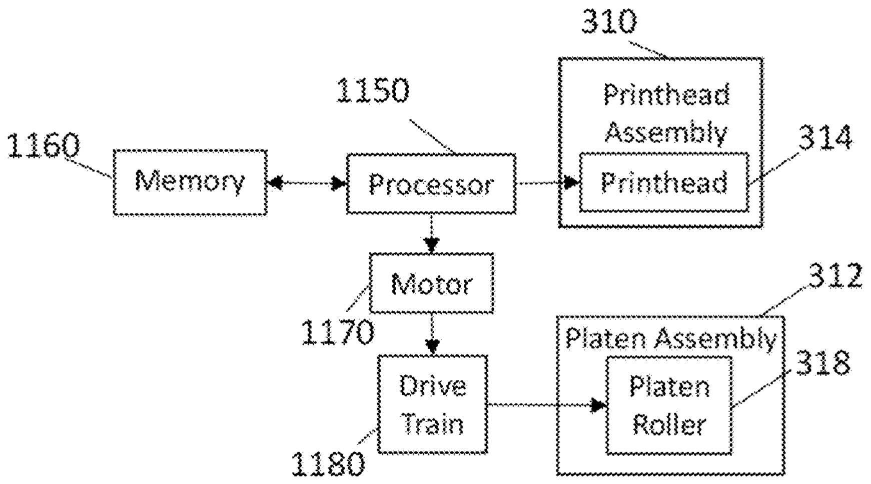
FIG. 11 illustrates a block diagram of the printer in accordance with embodiments of the present disclosure.

FIG. 11 depicts a block diagram describing the internal components of the printer 100 used in FIGS. 8-10. The processor 1150 is configured to be in communication with a memory 1160. The memory 1160 is configured to store non-transitory computer-readable medium such as programming language for use by the processor 1150. The processor 1150 is further in communication with the motor 1170, wherein the processor 1150 is capable of operating the motor in the first operating mode or the second operating mode. The motor 1170 is configured to drive the drive train 1180 where the drive train 1180 either is meshed with the drive gear or the drive gear is part of the drive train 1180. The drive gear then rotates the platen assembly which causes the platen roller 318 to turn. Further, the processor 1150 is in communication with the printhead 314. The printhead 314 is supported by the printhead assembly 310, which is lifted by the cam 504 as mentioned above.

In one embodiment, before activating the second operating mode, the media is fed forward 45 mm out of the printer past a point where the media may be cut. The platen assembly 318 then rotates in the second direction 55 mm until the cam 504 is in the third position. When the system is going to restart the first operating mode, the platen assembly 318 is rotated in the second direction an additional 10 mm, which positions the cam 504 back into the first position and lowers the printhead onto the media which allows the printer to resume media processing operations.

Figure 12:
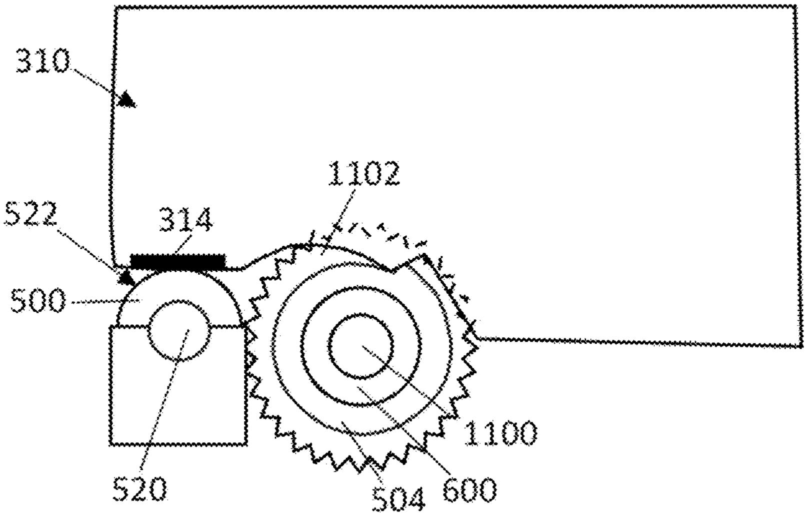
FIG. 12 illustrates an alternative embodiment utilizing a cam in accordance with embodiments of the present disclosure.

While the cam assembly 606 has been illustrated as being coaxially aligned with the axle 520 of the platen roller 522 in an example embodiment, the cam assembly 606 (including the cam 504 and the clutch 600 may be offset relative to and/or decoupled from the axle 520 of the platen roller 522 as shown in FIG. 12. As one example, a camshaft 1100 separate and distinct from the axle 520 of the platen roller 522 can support the cam assembly 606, which can be positioned adjacent to printhead assembly 310 and/or can be positioned adjacent to the platen roller 522. The camshaft 1100 extends through a frame of the printer, e.g., parallel/axially relative to the axle 520 of the platen roller 522 and is coupled to the drive motor 1170 via a gear 1102 that can drive the camshaft 1100 and cam assembly 606 through the first through third positions described herein to lift or lower the printhead 314.

Figure 13:
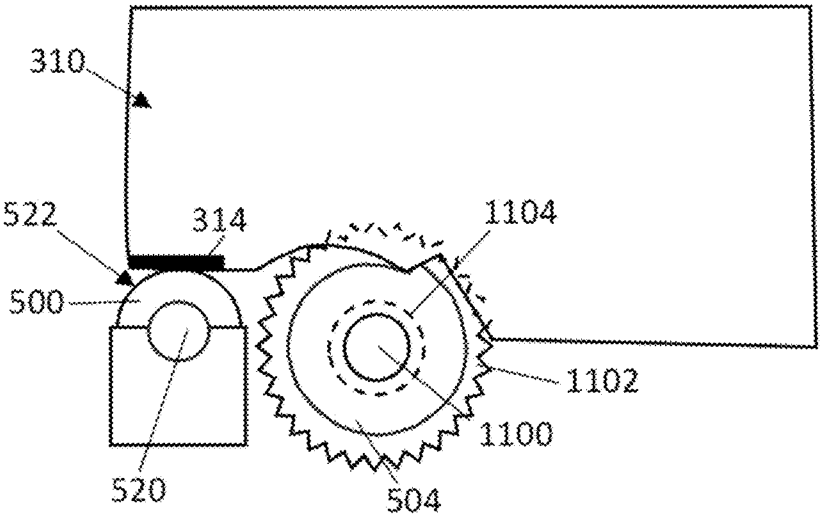
FIG. 13 illustrates another alternative embodiment utilizing a cam in accordance with embodiments of the present disclosure.

Alternatively, as shown in FIG. 13, the camshaft 1100 can support the cam 504 without the clutch 600 and the gear 1102 can be configured to have an internal one-way roller clutch 1104 that is configured such that when the drive motor 1170 operates in the first operating mode, the one-way roller clutch 1104 does not engage and the gear 1102 rotates around the stationary clutch 1104. When the drive motor 1170 operates in the second operating mode, the one-way roller clutch 1104 engages with the camshaft 1100 and allows the camshaft 1100 and the cam 504 to rotate into contact with the printhead assembly 310 and lift the printhead 314, against a biasing force that urges the printhead towards the platen roller 522, into the disengaged position (e.g., the cam 504 is in the third position). The operating modes can be programmed such that the second operating mode will continue to be used to lower the printhead back into the engaged position when printer operations are to be resumed. When the drive motor 1170 reverts back to the first operating mode, the clutch will once again remain stationary and prevent the camshaft from lifting the printhead until necessary.

The above description refers to diagrams of the accompanying drawings. Alternative implementations of the example represented by the diagrams include one or more additional or alternative elements, processes and/or devices. Additionally, or alternatively, one or more of the example elements of the diagram may be combined, divided, re-arranged or omitted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A media processing device comprising:

a platen assembly including a platen roller configured to rotate;

a printhead assembly, disposed opposite the platen assembly, configured to move between an engaged position in which the printhead assembly forms a nip with the platen roller and a disengaged position in which the printhead assembly is spaced away from the platen roller;

a drive element configured to rotate the platen roller;

a processor in communication with the drive element, the processor configured to control the drive element to rotate the platen roller according to a first operating mode or a second operation mode, the printhead assembly moves to the engaged position in the first operating mode and moves to the disengaged position in the second operating mode, wherein a strap is connected between the printhead assembly and the platen roller such that when the platen roller is driven in a second direction, the strap is configured to lift the printhead assembly.

2. The media processing device of claim 1, wherein when the processor operates per the first operating mode, the drive element rotates the platen roller in a first direction and when the processor operates per the second operating mode, the drive element rotates the platen roller in the second direction opposite the first direction.

3. The media processing device of claim 2, wherein the first direction is associated with the platen roller driving media.

4. The media processing device of claim 1, further comprising a housing having a cover, wherein the cover remains closed in the first and second modes of operation.

5. The media processing device of claim 1, wherein the platen assembly includes a drive gear concentrically secured to the platen roller, the drive gear in contact with a drive train of a motor within the media processing device.

6. The media processing device of claim 1, wherein a cam assembly comprises:

a clutch element mounted to the platen roller, and a rising cam element mounted around a perimeter of the clutch element;

wherein when the platen roller is driven in the first direction, the clutch element allows the rising cam element to remain stationary due to contact with the printhead assembly and when the platen roller is driven in the second direction, the rising cam element rotates with the platen roller and, via a profile of the rising cam element, lifts the printhead assembly.

7. The media processing device of claim 1, wherein when the printhead assembly is at the clearance level, there is no pressure on the media between the platen assembly and the printhead assembly.

8. The media processing device of claim 1, wherein the first operating mode is when the media processing device is idle.

9. A method for lifting a printhead assembly, the method comprising:

rotating a platen roller of a platen assembly in a first direction, the platen assembly disposed opposite the printhead assembly, wherein the platen assembly includes a cam assembly that is blocked from rotating with the platen roller in the first direction;

rotating the platen roller in a second direction opposite the first direction, wherein the cam assembly rotates with the platen roller in the second direction; and lifting, due to a profile of the cam assembly, the printhead assembly to generate a clearance between the printhead assembly and the platen assembly, wherein a strap is connected between the printhead assembly and the platen assembly such that when the platen assembly is driven in the second direction, the strap is configured to lift the printhead assembly.

10. The method of claim 9, wherein the first direction is associated with a platen roller driving media, the platen roller associated with the platen assembly.

11. The method of claim 9, wherein the cam profile includes a dynamic radius.

12. The method of claim 9, wherein the platen assembly includes a drive gear concentrically secured to the platen roller, the drive gear in contact with a drive train of a motor to rotate the platen assembly.

13. The method of claim 9, wherein the cam assembly comprises:

a clutch element mounted within the platen assembly, and a rising cam element mounted around a perimeter of the clutch element;

wherein when the platen assembly is driven in the first direction, the clutch element allows the rising cam element to remain stationary due to contact with the printhead assembly and when the platen assembly is driven in the second direction, the rising cam element rotates with the platen assembly and, via a profile of the rising cam element, lifts the printhead assembly.

* * * * *